(12) United States Patent
Jacobus et al.

(10) Patent No.: US 8,052,179 B2
(45) Date of Patent: Nov. 8, 2011

(54) UNLOCKING DEVICE FOR A CONTROL DEVICE

(75) Inventors: Heinz Jacobus, Dudweller (DE); Alexander Weingardt, Saarbrücken (DE)

(73) Assignee: Hydac Electronic GmbH, Saarbrücken (DE)

( * ) Notice: Subject to any disclaimer, the term of this patent is extended or adjusted under 35 U.S.C. 154(b) by 619 days.

(21) Appl. No.: 12/085,173

(22) PCT Filed: Oct. 24, 2006

(86) PCT No.: PCT/EP2006/010211
§ 371 (c)(1),
(2), (4) Date: May 19, 2008

(87) PCT Pub. No.: WO2007/059834
PCT Pub. Date: May 31, 2007

(65) Prior Publication Data
US 2009/0120146 A1 May 14, 2009

(30) Foreign Application Priority Data
Nov. 24, 2005 (DE) .......................... 10 2005 056 816

(51) Int. Cl.
*E05C 17/56* (2006.01)
*E05C 3/06* (2006.01)

(52) U.S. Cl. ..................... 292/251.5; 292/201; 292/340; 292/DIG. 61

(58) Field of Classification Search .................. 292/201, 292/207, 251.5, 340–341.19, DIG. 61
See application file for complete search history.

(56) References Cited

U.S. PATENT DOCUMENTS

| | | | | |
|---|---|---|---|---|
| 971,423 A | * | 9/1910 | Walters | 292/201 |
| 1,199,199 A | * | 9/1916 | Mason | 292/201 |
| 1,323,007 A | * | 11/1919 | Brunette | 160/290.1 |
| 2,381,633 A | * | 8/1945 | Young | 292/341.17 |
| 2,957,721 A | * | 10/1960 | Sklaw et al. | 292/341.15 |
| 3,325,203 A | * | 6/1967 | Moler | 292/201 |
| 4,088,354 A | * | 5/1978 | Kolendowicz | 292/201 |
| 5,042,857 A | * | 8/1991 | Burrows et al. | 292/341.16 |
| 5,176,417 A | * | 1/1993 | Bauer | 292/201 |
| 5,263,347 A | * | 11/1993 | Allbaugh et al. | 70/257 |
| 6,036,241 A | * | 3/2000 | Ostdiek et al. | 292/229 |

(Continued)

FOREIGN PATENT DOCUMENTS
DE        198 30 407 A1    1/2000
(Continued)

*Primary Examiner* — Carlos Lugo
(74) *Attorney, Agent, or Firm* — Roylance, Abrams, Berdo & Goodman, L.L.P.

(57) ABSTRACT

An unlocking device for a control device (10) includes an actuating magnet (12) in a coil base (14) and/or in housing elements of the actuating magnet. An actuating element (16) can be displaced along a first axis (20) and releases, in an actuation position, a swivel path (22) for a control unit (24) arranged to swivel about a second axis (26). The control unit (24) has a locking element (30) which, when unlocked by the actuating element (16) via the control element (24), releases the trajectory (32) for the control device (10) to be actuated. The unlocking device also has a swiveling lever (34) guided in a housing part (28) to swivel. The second axis (26) is parallel to the first axis (20). The swiveling lever (34), at its free end and when the actuating magnet (12) is not actuated, contacts the actuating element (16). The locking element (30) is disposed on the other end of the swiveling lever (34) and maintains the control device (10) in the locked position.

7 Claims, 5 Drawing Sheets

U.S. PATENT DOCUMENTS

| | | | |
|---|---|---|---|
| 6,139,073 A * | 10/2000 | Heffner et al. | 292/201 |
| 6,290,281 B1 * | 9/2001 | Durrani et al. | 296/121 |
| 7,004,517 B2 * | 2/2006 | Vitry et al. | 292/213 |
| 7,416,228 B2 * | 8/2008 | Pfitzinger et al. | 292/216 |

FOREIGN PATENT DOCUMENTS

| | | |
|---|---|---|
| DE | 199 49 944 C1 | 12/2000 |
| DE | 102 15 054 A1 | 10/2003 |
| DE | 10 2004 017 688 A1 | 11/2005 |
| WO | WO 99/61730 | 12/1999 |
| WO | WO 01/87666 A1 | 11/2001 |
| WO | WO 2004/056606 A1 | 7/2004 |

* cited by examiner

UNLOCKING DEVICE FOR A CONTROL DEVICE

FIELD OF THE INVENTION

The invention relates to an unlocking device for a control device, with an actuating magnet guided in a coil base and/or in a housing part of the actuating magnet. The actuating magnet has an actuating element movable along a first axis. In the actuating position, the actuating element clears a swiveling path for a control unit mounted to be able to pivot around a second axis. The control unit has a locking part unlocked by the actuating element via the control unit, and clears the path of movement for the control device to be actuated.

BACKGROUND OF THE INVENTION

Devices of this type are known and are disclosed, for example, in DE 102 15 054 A1. Unlocking devices such as these can be used for a plurality of applications. Especially wherever it is important to execute an actuating process for a technical component in a dedicated and reliable manner, unlocking devices with actuating magnets are preferred. This actuating magnet even in rough, everyday operation, for example, when exposed to vibrations or impacts, is reliable in use, as experience shows. With this unlocking device, in particular in the motor vehicle domain, safety-relevant parts can be unlocked and caused to operate, whether in the form of a roll bar to be deployed or in the form of a headrest movable forward in case of a crash to reduce the free impact path between the back of the head of the seat occupant and the head impact surface on the headrest, etc.

SUMMARY OF THE INVENTION

An object of the invention is to provide an unlocking device characterized by a compact construction that is reliable even under rough operating conditions.

According to the invention, this object is basically achieved by an unlocking device having a special axial arrangement in the unlocking device such that the actuating magnet with the actuating element and a transversely swiveling pivoting lever can be housed in a very small installation space. This device can then be housed in a space-saving manner within motor vehicles. Due to the space-saving structure, the unlocking device can also be used directly at the location of a actuating process. In the prior art, optionally first Bowden cables which are complex to handle accomplished the actuating process over longer paths.

In the unlocking device according to the invention, the pivoting lever of the control unit is guided to swivel around the second axis in a housing part. The second axis extends parallel to the first axis along which the actuating element moves. The pivoting lever on its one free end in the unactuated state of the actuating magnet is in contact with the actuating element. The locking part is kept in the locking position on the other end of the pivoting lever. As a result of the pivoting lever used, the unlocking process can be actuated without hindrance or time delay after actuating the actuating magnet by energizing it.

Preferably, in the actuated state of the actuating magnet the control device by an energy storage device induces unlocking for the pivoting lever. The pivoting lever is swiveled around the second axis into the unlocking position. As a result of the control device being pretensioned by the energy storage device, the unlocking process can be promptly actuated without delay and without jerking. This ability in turn satisfies increased safety requirements on real-time actuation of the safety device.

The locking part can be guided in the housing part and, held by a blocking part in the unlocked position. Unintentional re-locking of the control device is then prevented. This structure ensures that an already activated safety device is not unintentionally returned to the initial position from where it can no longer reliably perform its function if necessary upon re-actuation, for example, because the safety device itself or its parts would have to be replaced by new parts before being actuated again. If preferably a spring arrangement is used for the control device, likewise for the blocking part, the respective actuating or blocking state can be established fundamentally with only one type of technical actuation in the form of springs or spring elements. This arrangement takes into account increased requirements for practicability.

Other objects, advantages and salient features of the present invention will become apparent from the following detailed description, which, taken in conjunction with the annexed drawings, discloses a preferred embodiment of the present invention.

BRIEF DESCRIPTION OF THE DRAWINGS

Referring to the drawings which form a part of this disclosure and which are schematic and not to scale.

DETAILED DESCRIPTION OF THE INVENTION

Figure 1:
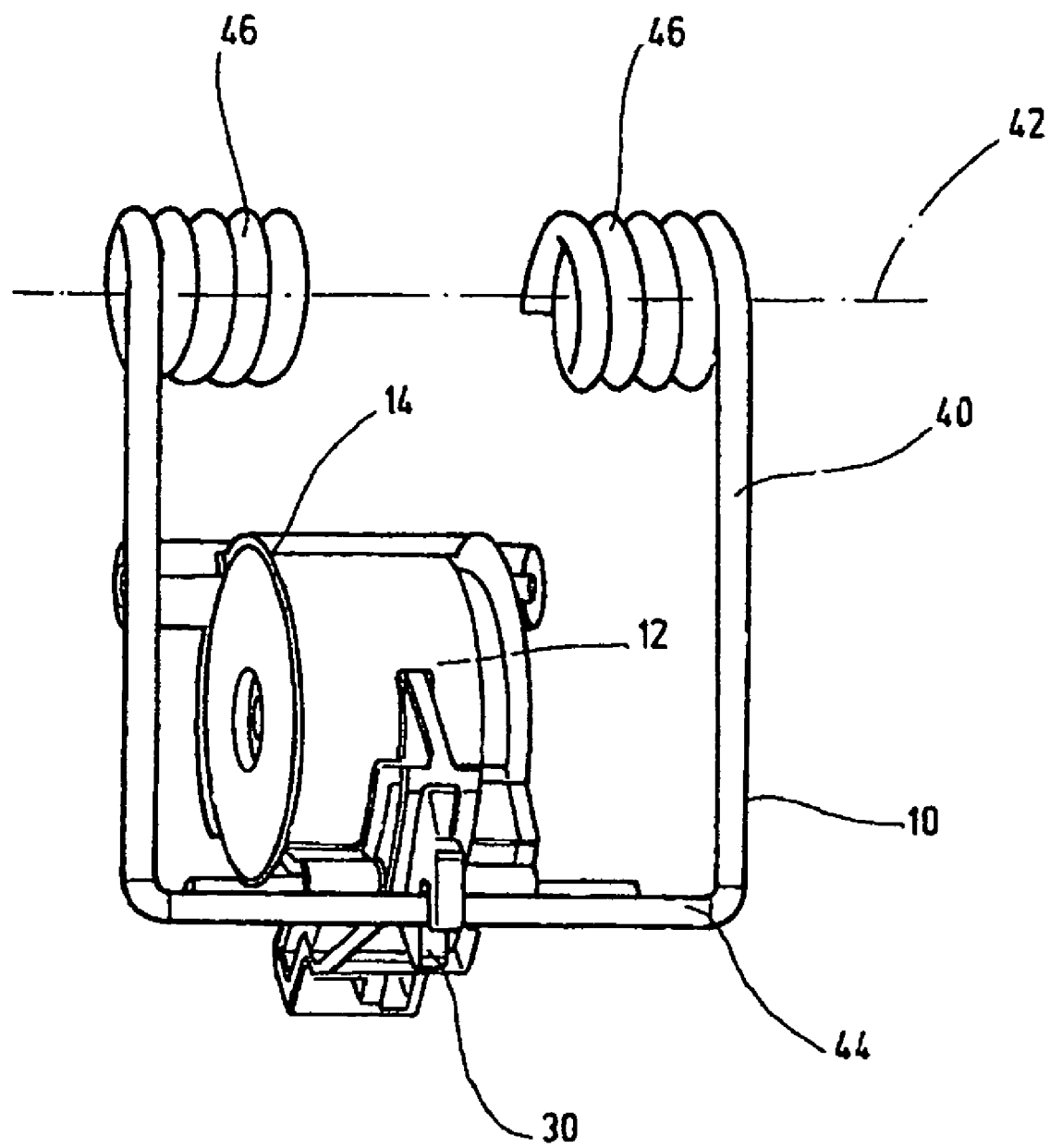
FIG. 1 is a front perspective view and an unlocking device according to an exemplary embodiment of the invention.

The unlocking device for the control device 10, according to the perspective view of FIG. 1 showing its most important components, includes an actuating magnet 12. The actuating magnet 12 has a coil base 14 with a coil winding (not detailed) and in which a cylinder shaped or rod shaped actuating element 16 is guided to be able to move lengthwise.

Figure 2:
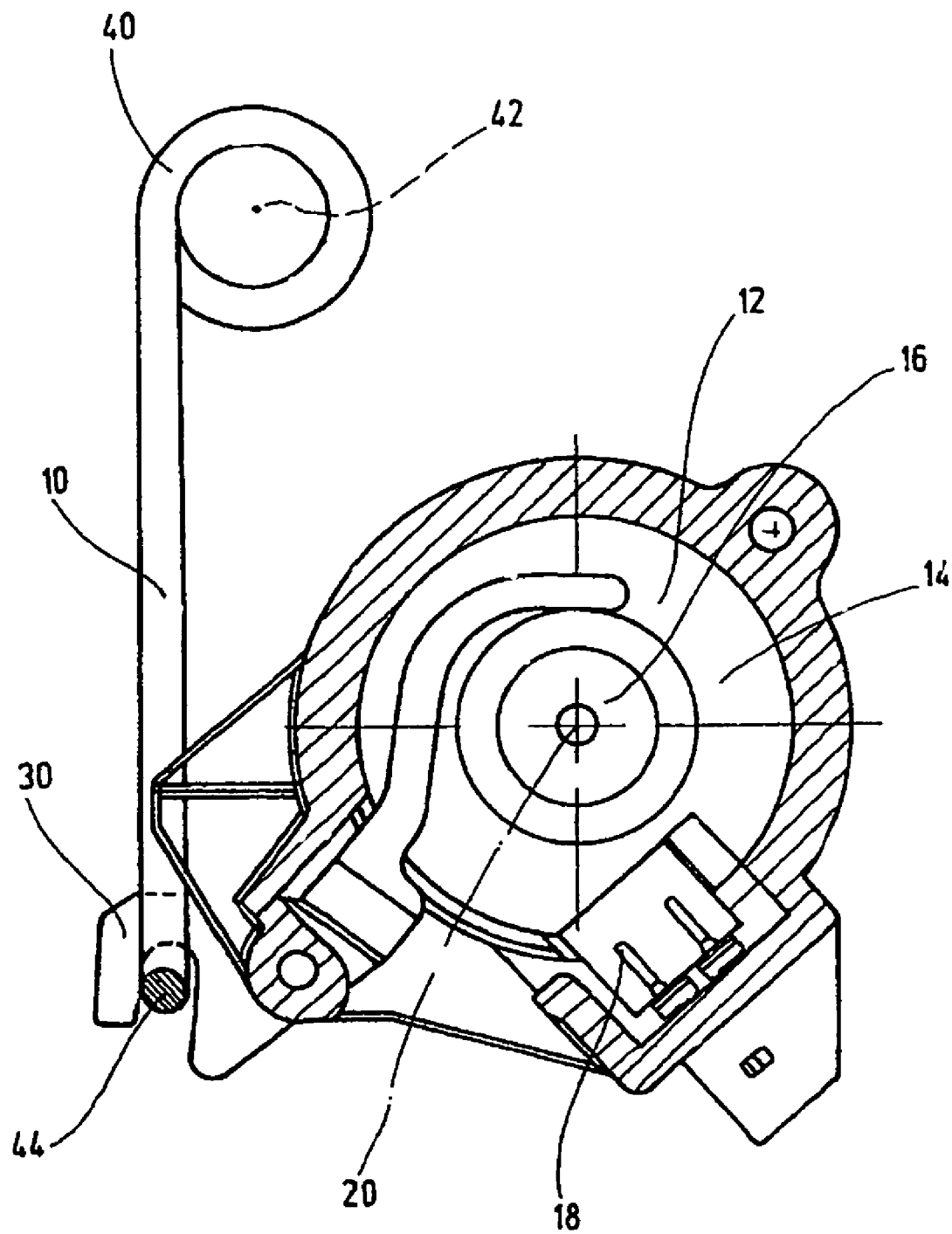
FIG. 2 is a side elevational view in section of the device of FIG. 1 in the locked state.

The actuating magnet 12, made in the manner of a conventional electromagnet, is designed such that when power is supplied to the coil base 14 via a connector 18, the actuating element 16 is pulled to the inside, that is, in the view of FIG. 2, in the direction of the rear plane of the figure. A reset spring (not detailed) can reset the actuating element 16 when the coil base 14 is not energized. The actuating element with a definable projection then protrudes over the front of the coil base 14 including the front of the actuating magnet 12. In this respect the actuating element 16 is therefore arranged to be able to move along a first axis 20.

Figure 3:
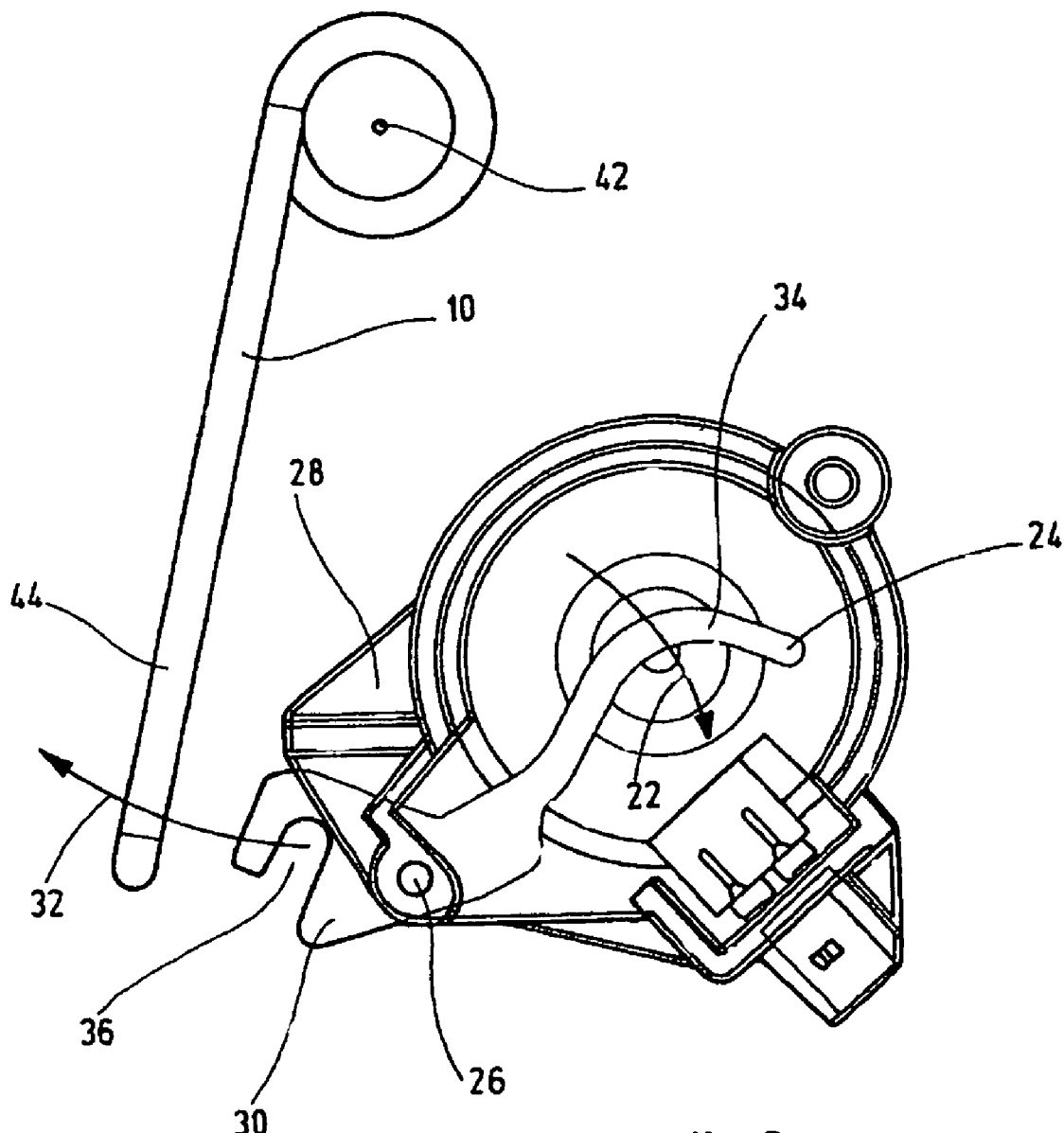
FIG. 3 is a side elevational view in section of the device of FIG. 1 in the unlocked state.

In the actuating position of the unlocking device shown in FIG. 3, the actuating element 16 is pulled to the rear by the actuating magnet 12 and thus clears a swiveling or pivoting path 22 extending transversely to the first axis 20 and shown in FIG. 3 with an arrow. Along this swiveling or pivoting path 22, control unit 24 pivots clockwise around a second axis 26 extending parallel to the first axis 20. This second axis 26 is, for example, made as a pivoting axle or pivoting journal. Its free ends are guided on the end side in the housing part 28, preferably formed from a suitable plastic material. As is further shown in FIGS. 1 to 3, the control unit 24 has a locking part 30. When unlocked by the actuating element 16 by way of the control unit 24, locking part 30 clears the path 32 of movement, shown in FIG. 3 with an arrow, for the control device 10 to be actuated. Inasmuch as FIGS. 1 and 2 relate to the locked position for the control device 10, the locking part 30 at least partially encompasses the control device 10 and in this way holds it in the locked position.

Figure 4:
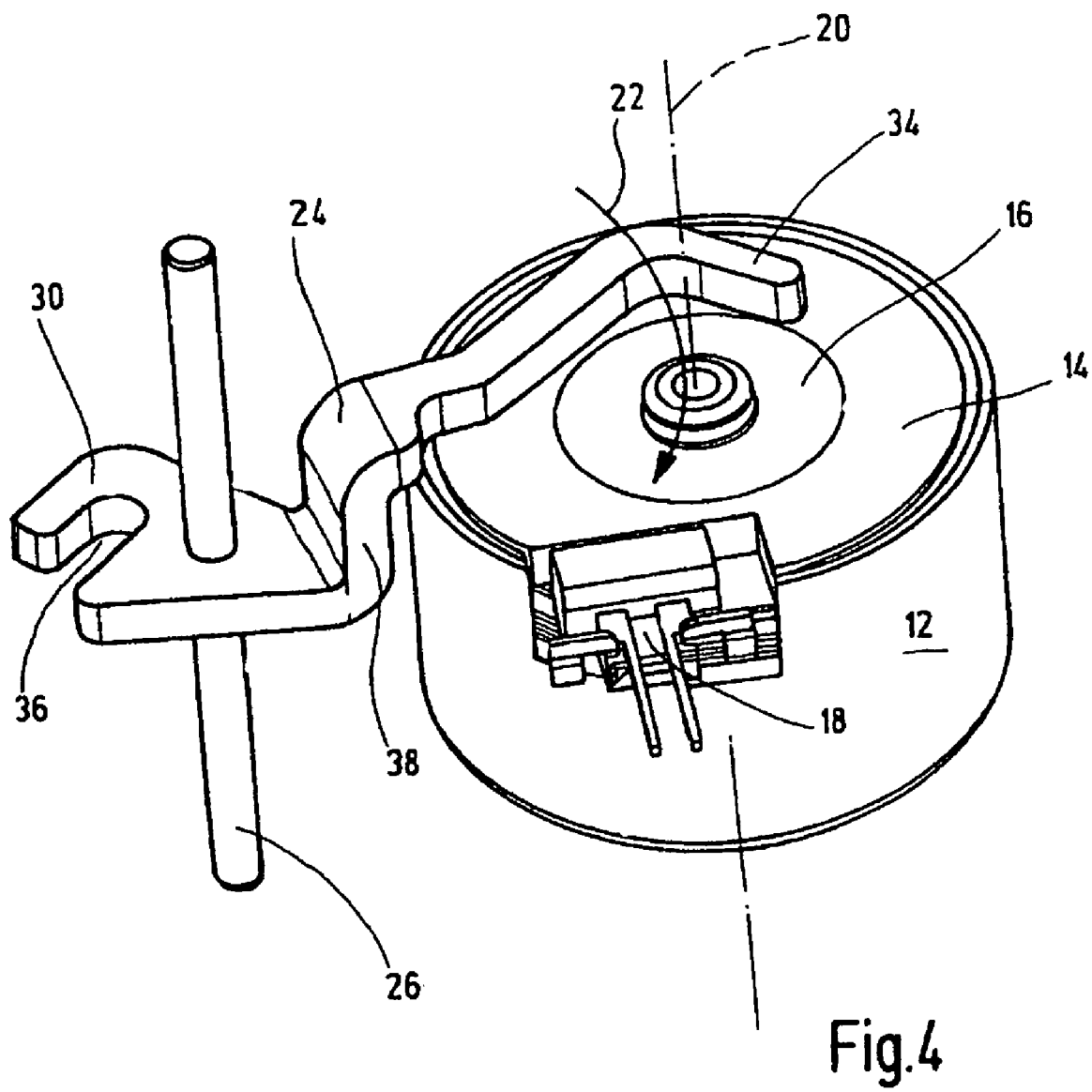
FIG. 4 is a perspective top view of the actuating magnet with a ratchet of the device of FIG. 1.

The control unit 24 has a pivoting lever 34, as shown in FIG. 4. The pivoting lever 34 is guided to be able to pivot around the second axis 26 in the housing part 28 which for the sake of simplicity has been omitted in FIG. 4. The pivoting lever 34 on its one free end in the unactuated state of the actuating magnet 12 is in contact with the actuating element 16. As shown in FIG. 4 the actuating element 16 can be moved into the coil base 14 of the actuating magnet 12 to clear the pivoting path 22 for the pivoting lever 34. Accordingly, in the retracted position of the actuating element 16, actuating element 16 forms with its front essentially a plane front surface with the front of the coil base 14 facing the viewer of FIG. 4.

As shown in FIG. 4, the pivoting lever 34 is still in its unactuated position. On the other end of the pivoting lever 34, the control device 10 is then held in the locking position. The locking part 30 of the control unit 24 is made in the manner of a claw or jaw opening 36. This locking part 30 can be arranged centrally, that is, force-equalized in the middle of the device (cf. FIG. 1). In this respect, the pivoting lever 34 has an axial offset 38 located therein to ensure this center arrangement. For the unlocking process, the claw or jaw opening 36 pivots clockwise around the pivoting axis 26 out of the locked position as shown in FIGS. 1 and 2 into the unlocked position as shown in FIG. 3.

In certain application tasks, a rotary spring or the like can be attached to the second axis 26 to move the pivoting lever along the swiveling path 22 as soon as the actuating element 16 has been pulled into the coil base 14. In this case, however, in the actuated state of the actuating magnet 12, the control device 10 by an energy storage device will cause unlocking for the pivoting lever 34 from the outside which then pivots around the second axis 26 into the unlocked position. For this reason, the control device 10 provides for a spring clamp, preferably in the form of a double spring clamp 40, with an energy storage device in the form of spring energy in the unlocked state enabling pivoting away along the path 32 of movement from the control unit 24 for the control device 10. Specifically, control device 10 around a third axis 42 extending parallel to the first axis 20 and the second axis 26. Based on the inherent dynamics of the control device 10 in the form of the double spring clamp 40, it is therefore sufficient to actuate the actuating magnet 12 to be able to undertake unlocking, controlled from the outside.

The actuating magnet 12 is made in the shape of a cup. In this respect, actuating magnet 12 has an annular coil base 14 with winding ends connected respectively to the connector 18. As the actuating element 16, the coil base 14 encompasses a flat-cylindrical actuating rod. The rod comparably has a cup shape to the annular coil base 14 and is guided to be able to move lengthwise therein. As FIG. 4 furthermore shows, the pivoting lever 34, on its one free end facing the actuating element 16 in the manner of a catch, is provided tapering with a curvature at least partially following the curvature of the outer periphery of the actuating element 16 (cf. also FIG. 2). The double spring clamp 40 with its clamp part 44 in the locking position engages the locking part 30 of the control unit 24. The two round springs 46 relating to the double arrangement encompass the third axis 42 in the middle.

Figure 5:
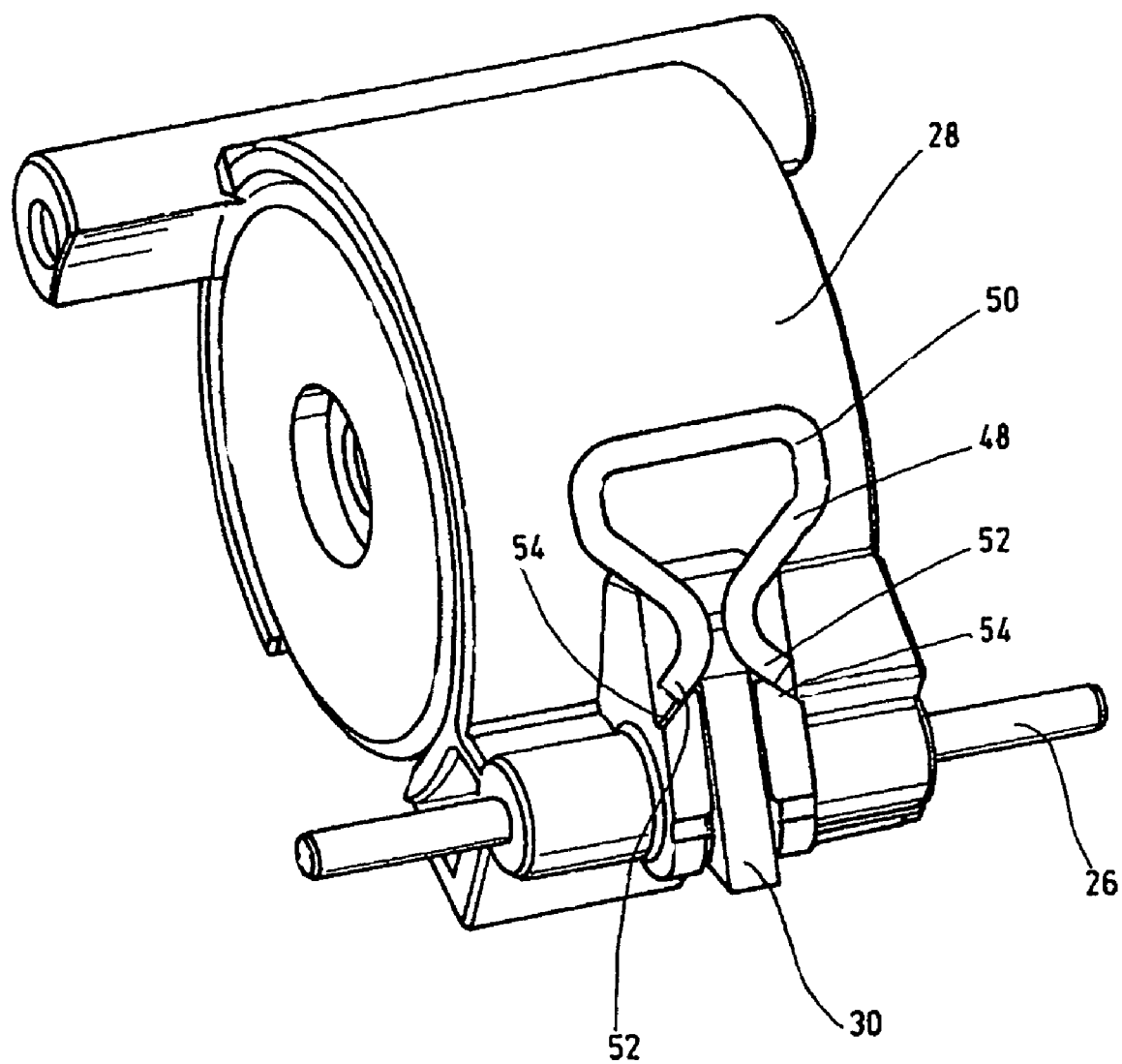
FIG. 5 is a partially cutaway perspective view of the housing of the device of FIG. 1, with the blocking element inserted.

If, as shown in FIG. 3, the control device 10 is pivoted counterclockwise back around the axis 42, the clamp part 44 catches again in the claw or jaw opening 36. The pivoting lever 24 then pivots counterclockwise into its initial position as shown in FIG. 4. If at this point the actuating magnet 12 is no longer energized, the actuating element 16, for example, under the action of a reset spring (not detailed), withdraws until the outside periphery of the actuating element 16 then again adjoins the inside of the pivoting lever 34. By a corresponding reset process, the unlocking device could again be "armed". In the invention this rearming is prevented, for example, because parts of a safety means (not shown) or the safety means itself must be replaced. Therefore, provision is made against the clamp part 44 again unintentionally engaging the locking part 30 and its claw or jaw opening 36 in the corresponding manner. To prevent this engagement, the locking part 30 is held in its unlocking position shown in FIG. 3. The blocking part 48 shown in FIG. 5 prevents unintentional re-locking of the control device 10.

The blocking part 48 includes a spring clamp 50 with free spring ends 52 guided at least partially along the housing part 28 and movable into the position to release the locking part 30. To better illustrate these conditions, in FIG. 5, relative to the front view, part of the wall of the housing part 28 is omitted to illustrate the action of the spring clamp 50 on the top of the locking part 30. In the position shown in FIG. 5, the spring clamp 50 forms the blocking part. When the unlocking process is actuated, the locking part 30 snaps upward and moves into the clamping gap between the spring ends 52.

The spring ends 52 between themselves then clamp a portion of the locking part 30 such that it is held in the unlocking position as shown in FIG. 3. If at this point, viewed in the direction of FIG. 5, the spring clamp 50 is pushed down by hand, the free spring ends 52 slide along the oblique guides 54 of the housing part 28 so that the spring ends 52 are spread apart from one another and then clear the swiveling path for the locking part 30. Locking part 30 can then return to the locking position. In a repeated unlocking process, the locking part 30 snaps upward again, and in this way entrains the spring clamp 50 with re-formation of the clamping gap for the locking part 30, so that then it is blocked again in its unlocked position and cannot be pivoted back unintentionally into the locking position.

The unlocking means according to the invention can be used for a plurality of applications. Instead of a control device 10 in the form of a double-spring clamp arrangement 40, a single spring (not shown) can be used. Other technical components such as, for example, parts of a roll bar system can be held by the claw or jaw opening 36 of the locking part 30 so that in this respect the range of application can be expanded at will. The FIG. 1 construction can also be used as an unlocking device even without the housing part or outside housing part to form the receiver for the device at the installation site.

The solution according to the invention is characterized especially by the fact that operation is controlled by a single lever in the form of the pivoting lever 34.

While one embodiment has been chosen to illustrate the invention, it will be understood by those skilled in the art that various changes and modifications can be made therein without departing from the scope of the invention as defined in the appended claims.

What is claimed is:
1. An assembly, comprising:
   a control device movable between a locked state and a release state and having an energy storage device biasing said control device toward said release state; and
   an unlocking device, including an actuating magnet in one of a coil base and a housing part of said actuating magnet;

an actuating element movable by said actuating magnet along a first axis between an actuated state and an unactuated state; and a control unit pivotable about a second axis parallel to said first axis along a swiveling path between a locked position and a release position and having a locking part and a pivoting lever being pivotable on said housing part about said second axis, said actuating element clearing said swiveling path allowing pivoting of said control unit from the locked position to the release position of said control unit when said actuating element is in the actuated state thereof, said pivoting lever having a free end contacting said actuating element in the unactuated state thereof to retain said control unit in the locked position thereof, said locking part being on an end of said pivoting lever opposite said free end thereof and holding said control device in the locked state thereof when said free end of said pivoting lever contacts said actuating element retaining said control unit in the locked position thereof and releasing said control device for movement toward the release state thereof when said control unit is in the release position thereof, said energy storage device biasing said control unit toward the release position thereof by engagement of said control device with said locking part.

2. An assembly according to claim 1 wherein
said actuating magnet is cup-shaped with an annular base encompassing said actuating element; and
said actuating element comprises a flat-cylindrical actuating rod with a polygonal shape.

3. An assembly according to claim 1 wherein
said control device comprises a spring clamp with said energy storage device being a spring, said spring clamp being pivotable about a third axis parallel to said first and second axes.

4. An assembly according to claim 3 wherein
said control device comprises a double spring clamp.

5. An assembly according to claim 1 wherein
said locking part comprises a claw with a jaw opening.

6. An assembly according to claim 1 wherein
said free end of said pivoting lever comprises a catch having a tapering curvature at least partially corresponding to an outer periphery of said actuating element.

7. An assembly according to claim 4 wherein
said double spring clamp comprises a clamp part engaging said locking part of said control unit in the locked state thereof, and comprises two round springs extending about said third axis.

\* \* \* \* \*